United States Patent [19]

Cole

[11] 4,140,329
[45] Feb. 20, 1979

[54] HITCH OF A WORK VEHICLE FOR SUPPRESSING PITCH

[75] Inventor: Carroll R. Cole, Decatur, Ill.

[73] Assignee: Caterpillar Tractor Co., Peoria, Ill.

[21] Appl. No.: 787,813

[22] Filed: Apr. 15, 1977

[51] Int. Cl.² ............................................. B62D 53/02
[52] U.S. Cl. ..................................... 280/489; 280/492
[58] Field of Search ...................... 280/492, 489, 488; 180/12

[56] References Cited

U.S. PATENT DOCUMENTS

| 2,976,031 | 3/1961 | Takagi | 267/15 |
| 3,118,686 | 1/1964 | McAdams | 280/489 X |
| 3,135,529 | 6/1964 | Conrad | 280/489 |
| 3,311,389 | 3/1967 | Barton et al. | 280/489 |
| 3,865,135 | 2/1975 | McWilliams | 280/489 X |
| 3,865,205 | 2/1975 | Swanson | 180/12 |
| 3,963,086 | 6/1976 | Mason | 180/12 X |

Primary Examiner—John A. Pekar
Attorney, Agent, or Firm—John L. James

[57] ABSTRACT

A hitch of a work vehicle having first and second vehicle portions has a first hitch apparatus for horizontally pivotally connecting the vehicle portions and a second apparatus with biasing for vertically, pivotally connecting the vehicle portions and suppressing vertical movement of one portion relative to the other.

2 Claims, 3 Drawing Figures

HITCH OF A WORK VEHICLE FOR SUPPRESSING PITCH

BACKGROUND OF THE DISCLOSURE

A work vehicle having a first vehicle portion pivotally connected to a second vehicle portion of articulating motion often experience serious pitching or vertical movement of one of the vehicle portions relative to the other. An example vehicle would be a tractor-scraper wherein heavy dirt loads are carried by a bowl of the first vehicle means. As the weight of the loads increases, it has been found that the magnitude of the pitch or vertical movement of the second vehicle portion increases. This causes an operator riding on the second vehicle portion to be undesirably bounced around during operation of the vehicle. These undesirable pitching motions result from the geometry of the vehicle and the position of the bowl.

Heretofore, apparatus has been constructed to restrict this undesirable movement. Although such apparatus suppress this undesirable bounce, it is desirable to provide apparatus which is of more simple construction, is easier to maintain and function to more effectively suppress the undesirable bounce.

The present invention is directed to overcome one or more of the problems as set forth above.

According to the present invention, a work vehicle has first and second vehicle portions each having an axle assembly and being horizontally pivotally connected one to the other by hitch means at a location substantially directly over the axle of the second vehicle portion. A second means is provided for vertically pivotally connecting the first and second vehicle portions together. The frame member has first and second end portions and a middle portion connectable to the second axle assembly with said first end portion being of a configuration sufficient for overlaying the second axle assembly in the connected position. Means is positioned between and is connected to the second axle assembly and the first end portion of the frame member for controllably biasing the first end portion of the frame member against movement toward and from the underlying second axle assembly.

DETAILED DESCRIPTION OF THE INVENTION

Figure 1:
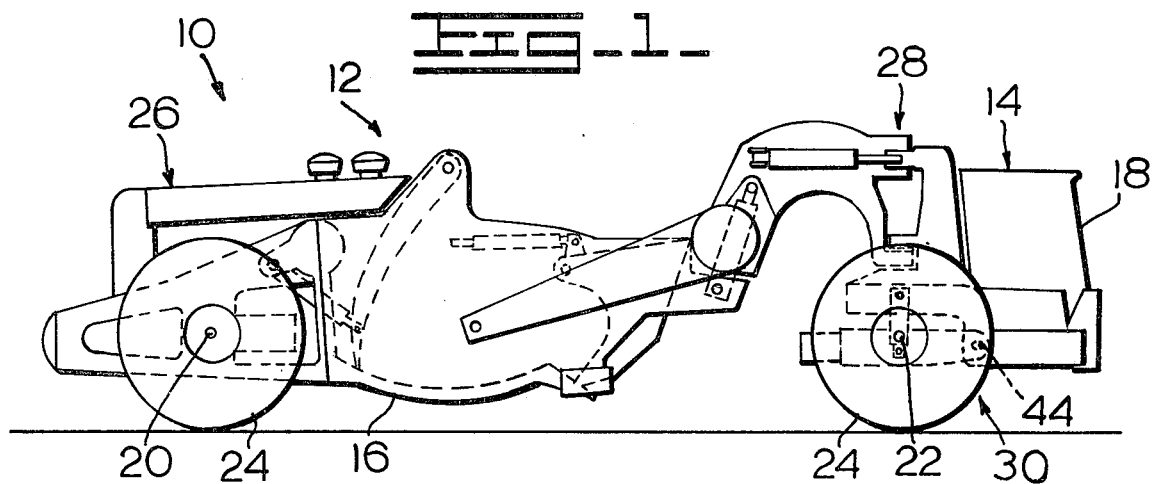
FIG. 1 is a diagrammatic side view of a work vehicle having the apparatus of this invention.

Referring to FIG. 1, a work vehicle 10, for example a tractor-scraper, has first and second vehicle portions 12, 14. The first vehicle portion 12 has load means 16 for receiving and carrying large volumes of dirt. The second vehicle portion 14 has means 18 for carrying an operator during operation of the vehicle 10. The first and second vehicle portions 12, 14 each have an axle 20, 22 carrying tires 24. Power means 26 is mounted on the first vehicle means.

The first vehicle portion 12 is horizontally pivotally connected to the second vehicle portion 14 by hitch means 28 at a location substantially directly above the axle 22 of the second vehicle portion 14.

Figure 2:
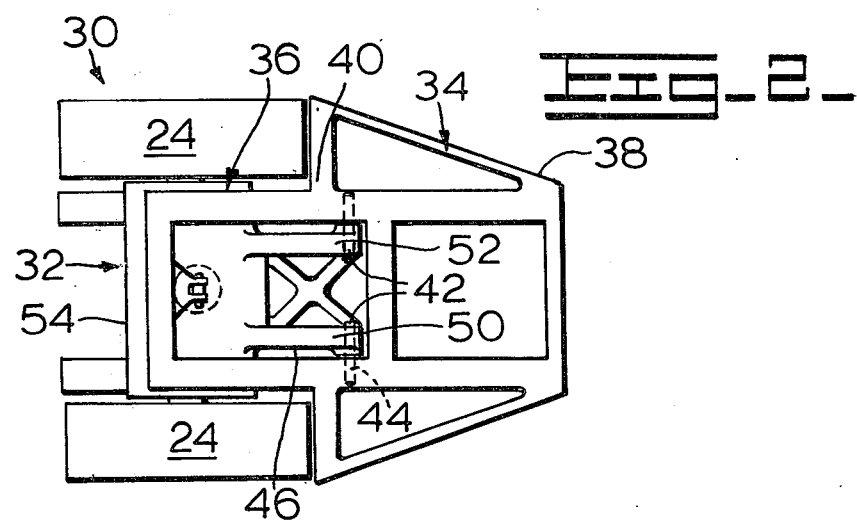
FIG. 2 is a diagrammatic plan view of the apparatus of this invention.
Figure 3:
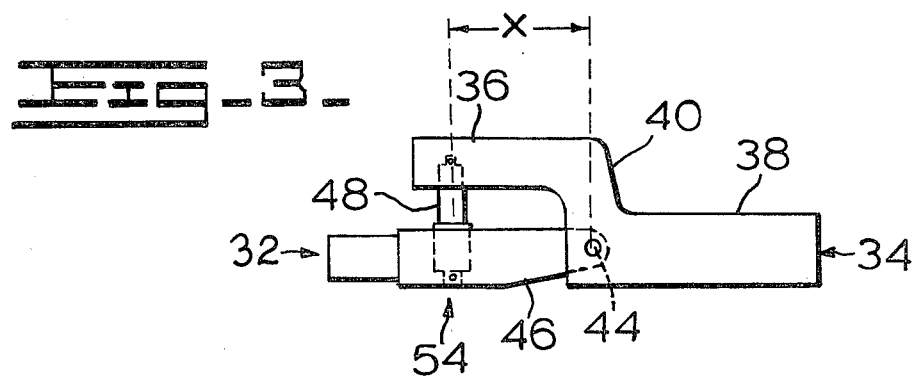
FIG. 3 is a diagrammatic side view of the apparatus of this invention.

A second hitch means 30, better seen in FIGS. 2 and 3, vertically pivotally connect the first and second vehicle portions 12, 14. By this construction the second vehicle portion 14 can move horizontally and vertically relative to the first vehicle portion 12 for turning the vehicle and traveling over uneven ground.

Referring to FIGS. 2 and 3, the second hitch means 30 has a first hitch member, such as trailing linkage or axle frame 32 which carries the axle 22 for wheels 24 of the second vehicle portion 14, and a second hitch element, such as frame member 34 of the second vehicle portion 14. The frame member 34 extends outwardly from the second vehicle portion 14 and is connected thereto.

The frame member 34 has first and second end portions 36, 38 and a middle portion 40. The middle portion 40 of the frame member 34 is connected to the axle frame 32. In the connected position, the first end portion 36 of the frame member 34 overlays at least a portion of the axle frame 32 and preferably is spaced therefrom. As shown in FIG. 3, the frame member 34 is of a nonlinear configuration.

Openings 42 are provided through the first end portion 46 of the axle frame 32 and the middle portion 40 of the frame member 34 for receiving a pin 44 for pivotally connecting the members 32, 34. In the installed position, the pin extends generally horizontally for providing for the vertical pivoting of the vehicle portions 12, 14.

Means 48, such as a hydraulic cylinder, is positioned between and connected at its ends to the axle frame 32 and the first end portion 36 of the frame member 34. The means 48 is constructed for controllably biasing said first end portion 36 of the frame member 34 against movement toward and from the underlying axle frame 32. Means 48 can be a single element or a plurality of elements and can be sized for opposing, to a preselected magnitude, forces subjected thereon.

The biasing means 48 is positioned a preselected distance "X", along the axle frame 32 from the picotal connection at the middle portion 40 of the frame member 34. This preselected distance "X" provides a movement arm through which the pitching forces are opposed by the biasing means 48.

In a preferred embodiment, the first end portion 46 of the axle frame 32 is of a forked configuration with the forks 50, 52 spaced one from the other a distance sufficient for receiving the middle portion 40 of the frame member 34 between the fork elements 50, 52. A middle portion 54 of the axle frame 32 is connected to the biasing means 48.

It should be understood that the forked elements 50, 52 can be on the frame member 34 and the axle frame 32 can be of nonlinear configuration without departing from this invention. The arrangement shown, however, is preferred owing to the fact that in this construction the generally experienced initial pitch force will place the biasing means 48 in compression.

The embodiments of the invention in which an exclusive property or privilege is claimed are defined as follows:

1. In a hitch of a work vehicle including a first vehicle portion having an axle assembly with an axle and axle frame and a second vehicle portion having an axle assembly with an axle and axle frame, said first vehicle portion having load carrying means and being pivotally connected to the second vehicle portion by hitch means at a location substantially directly over the axle of the second vehicle portion and pivotally movable about a substantially vertical pivot axis, the improvement comprising:
- a frame member connected to the second vehicle portion and extending outwardly therefrom, said frame member having first and second end portions and a middle portion connectable to the axle frame of the second vehicle portion with said first end portion being of a configuration for overlaying said second vehicle portion axle frame in the connected position said second vehicle portion axle frame being pivotally movable about a substantially horizontal pivot axis:
- a single biasing means positioned between and connected to the second vehicle portion axle frame and the first end portion of the frame member for controllably biasing said first end portion of the frame member against vertical movement toward and from the underlying second vehicle portion axle frame, said second vehicle portion axle frame having a first end portion and a middle portion, said first end portion being of a forked configuration with a first fork element and a second fork element, said middle portion of the second axle frame being connected to the biasing means, said first fork element having an opening alignable with a first opening of the middle portion of the frame member, said second fork element having an opening alignable with a second opening of the middle portion of the frame member; and
- a pin extendable through said openings for connecting the frame member and second vehicle portion axle frame.

2. A hitch, as set forth in claim 1, wherein the biasing means includes a substantially vertical hydraulic element positioned substantially directly under the hitch means and pivotal connection of the first and second vehicle portions, said hydraulic element connecting the frame member and second vehicle portion axle frame and limiting vertical movement of the frame member relative to the second vehicle portion axle frame thereby limiting the transferring of bouncing and pitching motion of the work vehicle to the second axle frame, said hydraulic element transferring the bouncing and pitching motion from the hitch means directly downwardly to the second vehicle portion axle frame.

* * * * *